United States Patent [19]

Dutta et al.

[11] 3,878,280
[45] Apr. 15, 1975

[54] METHOD FOR PRODUCTION OF TRANSPARENT YTTRIUM OXIDE

[75] Inventors: Sunil K. Dutta, Waltham; George A. Gazza, Sudbury, both of Mass.

[73] Assignee: The United States of America as represented by the Secretary of the Army, Washington, D.C.

[22] Filed: May 5, 1970

[21] Appl. No.: 34,861

[52] U.S. Cl. .................... 264/65; 264/66; 264/125; 264/332
[51] Int. Cl. ......................... F27d 9/04; C04b 33/32
[58] Field of Search .............. 264/65, 66, 125, 332; 106/39.5

[56] References Cited
UNITED STATES PATENTS

| | | | |
|---|---|---|---|
| 3,525,597 | 8/1970 | Mazdiyasni et al. | 264/66 |
| 3,545,987 | 12/1970 | Anderson | 106/39 |

OTHER PUBLICATIONS

J. E. Burke (Ed.), Progress in Ceramic Science, Vol. 4, 1963, Pergamon Press, New York, at 96–98 and 100–101.

J. D. Schieltz et al., "Anomalous Sintering Behavior of $Y_2O_3$," August, 1967, Journal of the American Ceramic Society, 439–440.

L. A. Brissette et al., "Thermomechanically Deformed $Y_2O_3$," March, 1966, J.A.C.S., at 165–166.

*Primary Examiner*—Robert F. White
*Assistant Examiner*—Thomas P. Pavelko
*Attorney, Agent, or Firm*—Robert P. Gibson; Nathan Edelberg; Eugene E. Stevens, III

[57] ABSTRACT

A method for the preparation of transparent yttrium oxide by the vacuum hot pressing of yttrium oxide ($Y_2O_3$) powder in a graphite die at temperatures of between 1300° to 1500° C and uniaxial pressures of between 5000 to 7000 psi, for a period of 1 to 2 hours.

6 Claims, No Drawings

METHOD FOR PRODUCTION OF TRANSPARENT YTTRIUM OXIDE

The invention described herein may be manufactured, used, and licensed by or for the Government for governmental purposes without the payment to us of any royalty thereon.

This invention relates to an improved method for the preparation of transparent yttrium oxide having a high tensile strength.

The preparation of transparent yttrium oxide is known in the art. R. A. Lefever and J. Matsko in an article entited "Transparent Yttrium Oxide Ceramics" in *Mat. Res. Bull*, Vol. 2, pp. 865–869 (1967), disclose the preparation of transparent yttrium specimens utilizing a lithium fluoride additive, and hot forging at a temperature of approximately 950°C and pressures of 10,000 to 12,000 psi, for a period of 48 hours.

R. M. Spriggs et al reported in an article entitled, "Thermomechanically Deformed $Y_2O_3$" *J. Amer. Cer. Soc.*, Vol. 49, No. 3, pp. 165–166, March 1966, that polycrystalline yttrium oxide is opaque when hot pressed but can be made transparent by press forging. In this case, a hot pressed specimen was thermomechanically deformed to produce a region of transparency.

Anderson et al. disclosed in "A Unique Optical Ceramic" *Optical Spectra*, January/February 1969, a transparent ceramic compound consisting of 90% yttrium and 10% thorium oxide.

In distinction from the prior art processes, the present invention comprises the vacuum hot pressing of yttrium oxide cold pressed powder compacts in a graphite die to produce a transparent yttrium oxide material in a relatively short time without the use of additives or press forging.

It is an object of this invention to provide and disclose a vacuum hot pressing method for the production of transparent yttrium oxide.

It is a further object of this invention to provide and disclose a method for the production of transparent yttrium oxide material having an ultrafine grain size of less than 1 micron.

It is a further object of the invention to provide and disclose a method for the production of transparent yttrium oxide material having an improved tensile strength.

It is a further object of this invention to provide and disclose a method for the vacuum hot pressing of cold pressed powder compacts to produce a transparent yttrium oxide material without the utilization of any additives.

It is a further object of this invention to provide and disclose a method for the production of transparent yttrium oxide material which involves a relatively short processing time.

Other objects and a fuller understanding of the invention may be had by referring to the following description and claims.

In operation, commercially available yttrium oxide having a minimum purity of 99.90 to 99.99%, is cold pressed by any conventional means to 45–65% of theoretical density, e.g., discs having a diameter of 1 inch. A cold pressed yttrium oxide compact is then loaded into a conventional vacuum hot press graphite die. The die comprises a graphite top punch and a graphite bottom punch. A tungsten disc is positioned between the yttrium oxide compact and the graphite top punch, and the yttrium oxide compact and the bottom punch in order to inhibit undesirable reactions between the yttrium oxide and the graphite. The vacuum chamber is evacuated and the temperature gradually raised at a rate of 5°–6° C per minute to around 300°–600° C. The temperature is maintained at 300°–600° C for a period of approximately 1 hour in order to remove undesired gases. An indication that the "outgassing" is complete is when a steady vacuum of $10^{-5}$ torr can be maintained in the chamber. A pressure of 5000 psi is then applied and the temperature is raised to 1400° C. A pressure range of 5000–7000 psi and temperature range of 1300°–1500° C was found operable. The pressure and temperature are maintained for a period of approximately 1–2 hours, then released and the specimen is allowed to slowly cool in the die in order to prevent thermal cracking.

A critical factor for producing transparency appears to be the temperature at which the pressure is initially applied. If the pressure is initially applied at too high temperature, i.e., 1300°–1500° C, transparency is not achieved. Transparency is further improved by slow controlled heating rates due to less gas entrapment during sintering.

Yttrium oxide specimens hot pressed by this procedure are fully transparent. Optical transmittance test results on these specimens show that in-line transmission exceed 80% into the infrared to approximately 6 microns. This is equivalent to the optical transmittance of the yttrium oxide compound of Lefever et al and Anderson. The optical properties of the compound of Spriggs et al are not disclosed.

A further advantage of the present hot pressing process is that an ultrafine grain size, less than 1 micron, is achieved which is important for improved strength as established from known strengthgrain size relationship with ceramic materials.

Possible application for transparent yttrium oxide include high intensity lamps, infrared windows for heat seeking rockets, windows for high temperature application, and development of transparent armor for ground vehicles.

Although we have described our invention with a certain degree of particularity, we wish it to be understood that we do not desire to be limited to the exact details shown and described, for obvious modification will occur to a person skilled in the art.

Having described our invention, we claim:

1. A method for the production of transparent yttrium oxide comprising the steps of:
   a. selecting a yttrium oxide powder having a purity of 99.90 to 99.99%,
   b. cold compressing the yttrium powder to form a compact 45–65% of theoretical density,
   c. evacuating the compact at a temperature of 300°–600° C,
   d. applying a pressure of 5000–7000 psi,
   e. raising the temperature to 1300°–1500° C,
   f. maintaining the pressure and temperature for a period of 1–2 hours, slowly cooling, and recovering transparent yttrium oxide having an ultrafine grain size of less than 1 micron.

2. A process in accordance with claim 1 wherein the temperature is raised to 300°–600° C at the rate 5°–6° C per minute.

3. A process in accordance with claim 1 wherein the yttrium oxide powder is compressed to 45% of theoretical density.

4. A process in accordance with claim 1 wherein a pressure of 5000 psi is applied after the evacuation.

5. A process in accordance with claim 4 wherein a temperature of 1400°C is applied after the application of a pressure of 5000 psi.

6. A process in accordance with claim 1 wherein the yttrium oxide powder is compressed to 65% of theoretical density.

* * * * *